United States Patent Office 3,210,210
Patented Oct. 5, 1965

3,210,210
PROCESS OF COATING OXYMETHYLENE COPOLMER SURFACES
Earl J. Ball, Shrewsbury, and Harry A. Cantor, Plainfield, N.J., Thomas M. Guastavino, Staten Island, N.Y., and John W. Wyart, Short Hills, N.J., assignors to Celanese Corporation of America, New York, N.Y., a corporation of Delaware
No Drawing. Filed Feb. 7, 1962, Ser. No. 171,575
4 Claims. (Cl. 117—138.8)

This invention relates to a coating process and more particularly to a process for providing adherent coatings on oxymethylene copolymer surfaces.

Oxymethylene copolymers having successively recurring oxymethylene groups and randomly interspersed carbon-to-carbon linkages are known to be useful in the fabrication of tough stable molded articles.

Such copolymers may comprise oxymethylene and high oxyalkylene units and be made by the copolymerization of trioxane with a cyclic ether having adjacent carbon atoms, as disclosed in U.S. application Serial No. 63,491, filed October 19, 1960, by Walling, Brown and Bartz, now Patent No. 3,027,352. Copolymers having interspersed carbon-to-carbon linkages may also be prepared by the copolymerization of trioxane with small amounts of cyclic acid anhydrides, cyclic carbonates, lactones and ethylenically unsaturated compounds which are cationically polymerizable. Such copolymers are disclosed in an article by Kern et al. in "Angewandte Chemie," 73 (6), pp. 177–186 (March 21, 1961).

It has been found that molded articles produced from such copolymers are unreceptive to coatings and that coating layers deposited on the surfaces of such articles by the usual lacquers and paints do not adhere.

It is an object of this invention to provide a method for coating oxymethylene copolymer surfaces with an adherent coating layer which may be a decorative coating layer or may be an undercoat for a decorative coating layer. Other objects will appear hereinafter.

In accordance with this invention there is provided a method of coating an oxymethylene copolymer surface, said copolymer comprising chains of successively recurring oxymethylene groups and containing carbon-to-carbon linkages interspersed in said chains, said method comprising applying to said surface a nitrocellulose lacquer and drying said lacquer.

Nitrocellulose lacquers comprising a solution of nitrocellulose and a linear polymer of an ethylenically unsaturated compound in a volatile solvent are preferred.

The nitrocellulose used in the above described coating solution is usally lacquer grade nitrocellulose having a nitrogen content between about 11.0 and about 12.2 and a viscosity (ASTM D–301–50) between about ¼ and about 10 seconds.

The linear polymer is preferably a vinyl polymer such as a polymer of a lower alkyl acrylate or of vinyl acetate. Vinylidene polymers such as polymers of lower alkyl methacrylates may also be used. Specific polymers include copolymers of vinyl acetate and butyl acrylate, copolymers of vinyl acetate and ethyl acrylate, copolymers of ethyl acrylate and methyl methacrylate, terpolymers of methyl methacrylate, ethyl acrylate and acrylic acid, terpolymers of methyl methacrylate, butyl acrylate and acrylic acid, and homopolymers of butyl methacrylate. The polymer is preferably in the molecular weight range between about 2000 and about 20,000.

The solvent used is any volatile organic liquid capable of dissolving the nitrocellulose and the linear polymer. Esters and ketones which have atmospheric boiling points below about 170° C. are generally suitable. Specific organic solvents useful alone or in solvent mixtures include methyl acetate, ethyl acetate, n-propyl acetate, isopropyl acetate, n-butyl acetate, cellosolve acetate (2-ethoxyethyl acetate), acetone, methyl ethyl ketone, methylisobutyl ketone and ethyl amyl ketone. It is usually advantageous to include a liquid diluent in the solvent mixtures. Diluents include alcohols and aromatic hydrocarbons such as n-butanol, n-propanol, isopropanol, toluene and xylene.

It is usually advantageous to include a plasticizer in the coating composition. Phthalate esters such as dioctyl phthalate, butyl benzyl phthalate and dibutyl phthalate and phosphate esters such as tricresyl phosphate, cresyl diphenyl phosphate and tris-$\beta$-chloroethyl phosphate are suitable.

The proportion of nitrocellulose relative to the linear polymer is preferably from about ⅓ to about 3 parts by weight of nitrocellulose per part of polymer. The solvent is preferably used in amounts which provide from about 55 to about 85 weight percent of solvent based on the combined weight of nitrocellulose, linear polymer and solvent.

The plasticizer is preferably used in amounts between about 15 and about 30 weight percent based on the combined weight of nitrocellulose and linear polymer.

The coating composition may be clear or may be pigmented. When pigmented coatings are desired, amounts sufficient to provide pigment volume concentrations of 20 to 40 percent are preferred.

Titanium dioxide, carbon black, and any of the inorganic or organic pigments regularly used in lacquer compositions may be used.

The oxymethylene copolymer articles are preferably molded from a copolymer containing from about 0.5 to about 25 weight percent of oxyalkylene units having adjacent carbon atoms and most preferably from a copolymer containing about 1 to about 5 weight percent of oxyethylene units. The copolymer is preferably stabilized by degradation of its molecule ends to a point where a stable carbon-to-carbon linkage exists at each end. Thermal degradation, as disclosed in application S.N. 803,562, filed April 2, 1959, by Dolce and Berardinelli, now Patent No. 3,103,499, or degradation by hydrolysis, as disclosed in application S.N. 23,658, filed April 21, 1960, by Berardinelli, now abandoned, may be used. The chemical stabilizers disclosed in said applications may be used and particularly a mixture of a phenolic antioxidant and a nitrogen-containing scission inhibitor.

The coating liquid may be applied to the surfaces of the oxymethylene copolymer articles in any known manner as by brushing, dipping or spraying. For most coating compositions it is best to bake the coating. Temperatures between about 145° and about 165° C. and baking times between about 30 and about 60 minutes are recommended. It appears that nitrocellulose and the oxymethylene copolymer react at temperatures above about 145° C. and the interfacial reaction enhances adhesion. The coatings formed are adherent and are not removed from the oxymethylene copolymer surface when scratched with a coin or when pressure sensitive tape is applied and then stripped away. The coatings, when pigmented as desired may comprise the desired decorative coatings. In many cases, however, it may be desired to use the coatings as undercoatings for other lacquers or for metallizing treatments.

*Examples I to VI*

In each of the following examples the monomers indicated were polymerized in the proportions indicated in the presence of a peroxide catalyst. In Examples I, II, IV, V and VI the catalyst was benzoyl peroxide at a 1% level and in Example III the catalyst was di-tertiary butyl peroxide at a 2% level. (The percentages based on the weight of total monomers.) The polymerization was carried out in the presence of 150 parts by weight of solvent per part of total monomer. The solvent components and proportions are shown below. Polymerization was at reflux temperature over a period of 8 hours.

| Examples | I | II | III | IV | V | VI |
|---|---|---|---|---|---|---|
| Monomer: | | | | | | |
| Butyl Methacrylate | 100 | | 100 | | | |
| Methyl Methacrylate | | 50 | | 50 | 60 | |
| Ethyl Acrylate | | 40 | | | 40 | |
| Butyl Acrylate | | | | 40 | | 20 |
| Acrylic Acid | | 10 | | 10 | | |
| Vinyl Acetate | | | | | | 80 |
| Solvent: | | | | | | |
| Xylene | 50 | 50 | 50 | 50 | | |
| N-Butanol | 50 | 50 | 50 | 50 | | |
| Ethyl Acetate | | | | | 100 | 100 |
| Conversion | 78 | 98 | 85 | 94 | 98 | 75 |
| Solids Content | 31 | 39 | 34 | 37 | 39 | 30 |

Pigment dispersions were prepared according to the following formulations:

| | White Dispersion, Percent | Black Dispersion, Percent |
|---|---|---|
| TiO$_2$ | 60.0 | |
| Carbon Black | | 7.0 |
| Nitrocellulose | 8.0 | 17.7 |
| Ethanol | 3.0 | 2.8 |
| Ethyl Acetate | 12.0 | 66.7 |
| Toluol | 17.0 | |
| Dibutyl Phthalate | | 5.9 |

Seven parts by weight of white pigment dispersion were blended with one port of black pigment dispersion to provide the pigment portion of the coating composition. The nitrocellulose had a viscosity of ½ second and a nitrogen content of about 12.0%.

A nitrocellulose solution was prepared in accordance with the following formulation:

| | Percent |
|---|---|
| Nitrocellulose | 14.0 |
| Butanol | 24.0 |
| Xylene | 24.0 |
| Ethyl acetate | 32.0 |
| Ethanol | 6.0 |

The nitrocellulose was identical to that described above. The solids content of the solution was 14%.

A solvent was prepared having the following formulation:

| | Percent |
|---|---|
| Methyl acetate | 40 |
| n-Butanol | 40 |
| Xylene | 20 |

A vehicle blend was prepared by blending 56 parts by weight each of the above linear polymer solutions, 34 parts by weight of nitrocellulose solution and 10 parts by weight of dioctyl phthalate. The solution weights were based on solids content.

Ninety parts by weight of the vehicle blend was blended with ten parts of pigment dispersion. Solvent was added where necessary to achieve a working viscosity (50–100 cps.) for the coating composition of Examples I to VI.

Panels were prepared by injection molding a trioxane-ethylene oxide copolymer containing 2 wt. percent of randomly distributed oxyethylene groups in the oxymethylene chains. The polymer had been stabilized prior to molding by thermal degradation of its unstable polymer ends (about 5–10% of the original polymer weight) and by incorporation of 0.1 wt. percent of cyanoguanidine and 0.5 wt. percent of 2,2′ methylene-bis (4-methyl 16 tertiary butyl phenol). The polymer was in the form of ⅛″ pellets coated with zinc stearate. The panels measured 3″ x 5″ x ⅛″.

The coating compositions of Examples I to VI were applied to the above panels (after washing with acetone) by spraying. The coated panels were dried at room temperature for about one hour until dry to the touch. The panels were then baked for 30 minutes at 150–155° C. and the coating layers adhered excellently.

*Examples VII to IX*

In each of the following examples the monomers indicated were polymerized in the proportions indicated in the presence of 1% of lauroyl peroxide, based on the total monomer weight. The polymerization was carried out in the presence of about 1.75 parts of water per part of total monomer. The polymerization temperature was 75–90° C. and the reaction time was 2 hours. In Example IX, 1% of acetaldehyde, based on the monomer weight was included to reduce the molecular weight.

| Example | VII | VIII | IX |
|---|---|---|---|
| | Percent | Percent | Percent |
| Monomer: | | | |
| Ethyl Acrylate | 15 | | |
| Butyl Acrylate | | 20 | 20 |
| Vinyl Acetate | 85 | 80 | 80 |

All conversions were about 99%. The polymer was recovered from water suspension, washed and dried and dissolved in a thinner solvent of the following formulation to produce a 30% (based on total weight) solution.

| | Parts by volume |
|---|---|
| Methyl ethyl ketone | 15 |
| n-Propyl acetate | 20 |
| n-Butanol | 8 |
| Cellosolve acetate | 12 |
| Toluene | 45 |

A nitrocellulose solution was prepared in accordance with the following formulation:

| | Wt. percent |
|---|---|
| Nitrocellulose | 28.5 |
| n-Butanol | 11.5 |
| Xylene | 30.0 |
| Methyl ethyl ketone | 25.0 |
| Cellosolve acetate | 5.0 |

The nitrocellulose was of the same grade described above.

Gray lacquers were prepared in accordance with the following formulation, using the copolymer solutions described above.

| | Parts by weight |
|---|---|
| White dispersion (see Examples I to VI) | 35 |
| Copolymer solution | 80 |
| Nitrocellulose solution | 60 |
| Butyl benzyl phthalate | 7 |
| Black dispersion (see Examples I to VI, sufficient to tint. | |

The formulations were reduced with an equal volume of the thinner solvent used to dissolve the copolymer in order to obtain spraying consistency.

The lacquers were sprayed, dried and baked as described in Examples I to VI and produced coatings of excellent adhesion.

*Example X*

A gray lacquer was prepared in accordance with the following formulation:

| | Parts by weight |
|---|---|
| Nitrocellulose solution (of Examples VII to IX) | 25 |
| Methyl methacrylate-ethyl acrylate copolymer solution (of Example V) | 26 |
| White dispersion (of Examples I to VI) | 27 |
| Black dispersion (of Examples I to VI), sufficient to tint. | |
| Butyl benzyl phthalate | 5 |

The formulation was reduced with an equal volume of the thinner solvent of Examples VII to IX in order to obtain spraying viscosity.

The lacquer was sprayed, dried and baked as described in Examples I to VI and produced coatings of excellent adhesion.

It is to be understood that the foregoing detailed description is given merely by way of illustration and that many variations may be made therein without departing from the spirit of our invention.

Having described our invention what we desire to secure by Letters Patent is:

1. A method of coating an oxymethylene copolymer surface in which said copolymer comprises chains of successively recurring oxymethylene groups and contains carbon-to-carbon linkages interspersed in said chains, said method including the steps of applying to said surface a solution of nitrocellulose and a linear polymer of an ethylenically unsaturated compound in a volatile common solvent for said nitrocellulose and said linear polymer to form a uniform liquid coating on said surface, and baking said coating at a temperature between about 145° C. and 165° C. for between approximately 30 and 60 minutes to render said coating tightly adherent upon said surface and resistant to removal by normal scratching as well as by pressure sensitive tape.

2. A coating method as defined in claim 1, in which the nitrocellulose is present in an amount of from about ⅓ to 3 parts by weight per part of linear polymer, and in which the solvent is present in an amount of from about 55 to 85% by weight based on the combined weight of nitrocellulose, linear polymer and solvent.

3. A coating method as defined in claim 1, in which the linear polymer is a lower alkyl acrylate polymer.

4. A coating method as defined in claim 1, in which the linear polymer is a vinyl acetate polymer.

References Cited by the Examiner

UNITED STATES PATENTS

| | | | |
|---|---|---|---|
| 3,027,352 | 3/62 | Walling et al. | 260—67 |
| 3,055,851 | 9/62 | Sanderson | 260—17 |

OTHER REFERENCES

Paist, "Cellulosics," Reinhold Pub. Corp., 1958, pp. 181–184 relied on.

WILLIAM D. MARTIN, *Primary Examiner.*

RICHARD D. NEVIUS, *Examiner.*